US008816642B2

(12) United States Patent
Brun-Buisson et al.

(10) Patent No.: US 8,816,642 B2
(45) Date of Patent: Aug. 26, 2014

(54) METHOD FOR USING A STAND-ALONE SYSTEM CONNECTED TO A BATTERY

(75) Inventors: David G Brun-Buisson, Vatilieu (FR); Antoine Labrunie, Paris (FR); Pierre Perichon, Voiron (FR)

(73) Assignees: Commissariat a l'Energie Atomique et Aux Energies Alternatives, Paris (FR); Bubendorff, Attenschwiller (FR)

( * ) Notice: Subject to any disclaimer, the term of this patent is extended or adjusted under 35 U.S.C. 154(b) by 358 days.

(21) Appl. No.: 13/394,984

(22) PCT Filed: Aug. 26, 2010

(86) PCT No.: PCT/FR2010/000582
§ 371 (c)(1),
(2), (4) Date: Mar. 30, 2012

(87) PCT Pub. No.: WO2011/030010
PCT Pub. Date: Mar. 17, 2011

(65) Prior Publication Data
US 2012/0187912 A1    Jul. 26, 2012

(30) Foreign Application Priority Data
Sep. 8, 2009 (FR) .................................. 09 04266

(51) Int. Cl.
*H02J 7/00* (2006.01)
(52) U.S. Cl.
USPC ........... 320/135; 320/134; 320/150; 320/153; 320/154
(58) Field of Classification Search
USPC ................... 320/135, 150, 153, 154
See application file for complete search history.

(56) References Cited

U.S. PATENT DOCUMENTS

| 4,952,862 A | 8/1990 | Biagetti et al. |
| 6,765,369 B2 * | 7/2004 | Rhee et al. ................... 320/132 |
| 2005/0206348 A1 * | 9/2005 | Tsuchiya et al. ............... 320/156 |

FOREIGN PATENT DOCUMENTS

| EP | 0 661 769 B1 | 9/1998 |
| FR | 2 714 772 A1 | 7/1995 |

OTHER PUBLICATIONS

Jan. 18, 2011 International Search Report issued in International Patent Application No. PCT/FR2010/000582 (with translation).

* cited by examiner

*Primary Examiner* — Samuel Berhanu
(74) *Attorney, Agent, or Firm* — Oliff, PLC (57) ABSTRACT

A method for using a stand-alone system, provided with an actuator connected to a battery, comprises during a discharging phase of the battery at a predetermined current the measurement of a temperature representative of the battery temperature and the determination of a first voltage threshold depending upon the measured temperature. Then, a voltage is measured at the battery terminals. An operating mode, selected at least between a normal and deteriorated mode, is determined, said stand-alone system being in the normal operating mode when the measured voltage is higher than the first voltage threshold, and in the deteriorated operating mode when the measured voltage is lower that the first voltage threshold, the current provided by the battery during an actuation being reduced when going from the normal mode to the deteriorated mode.

7 Claims, 7 Drawing Sheets

Figure 1

| Temperature Tb | Voltage Threshold $V_1$ |
|---|---|
| Lower than 5°C | Always in the deteriorated mode |
| Between -5°C and 0°C | 1,35V |
| Between 0°C and 60°C | 1,26V |
| Higher than 60°C | Always in the deteriorated mode |

METHOD FOR USING A STAND-ALONE SYSTEM CONNECTED TO A BATTERY

TECHNICAL FIELD OF THE INVENTION

The invention relates to a method for using a stand-alone system comprising an actuator connected to a battery.

STATE OF THE ART

Energy savings and trends towards renewable energies involve a development in new ways of using batteries, in particular during the charging and discharging process. The current control systems for the charging and discharging processes are not adapted to the constraints from renewable energies.

In the majority of the existing stand-alone systems, the discharging process for a battery is controlled by a regulator. The main objective of this regulator is to prevent the battery from being deeply discharged, which can cause an irreversible physical deterioration thereof.

The U.S. Pat. No. 4,952,862 describes a method for predicting in real time the remaining time for using a battery. This method uses measurements, made at regular intervals, of the voltage and the intensity of the current flowing through the battery for determining the remaining time until the battery stops. This method enables to inform a user about remaining time autonomy according to the way he/she uses the battery. This does not enable the operating time of the battery to be optimized.

The document FR-2714772 describes a supply battery for a device. The battery comprises a positive terminal, a negative terminal and a universal terminal. The universal terminal enables the device to control the battery.

OBJECT OF THE INVENTION

The object of the invention is to optimize the use of a battery of a stand-alone system from the system itself, while informing a user when the autonomy becomes low.

This objective is reached by the appended claims and in particular by the fact that, during a discharging phase of the battery, the method comprises at least one normal operating mode of the system and one deteriorated operating mode of the system, the method comprising the following steps:
- the measurement of a temperature representative of the battery temperature,
- the determination of a first voltage threshold depending upon the measured temperature,
- the measurement of a voltage at the battery terminals,
- the determination of the operating mode, said stand-alone system being in a normal operating mode when the measured voltage is higher than the first voltage threshold, and in a deteriorated operating mode when the measured voltage is lower than said first voltage threshold, the current provided by the battery during an actuation being reduced when going from the normal mode to the deteriorated mode.

According to a development, the voltage measurement at the battery terminals is carried out when the actuator is not actuated.

According to an improvement, the method comprises a critical operating mode associated with a second voltage threshold, according to the temperature, and lower than the first voltage threshold, the stand-alone system being in the deteriorated operating mode when the measured voltage is between the first voltage threshold and the second voltage threshold, and in the critical mode when the measured voltage is lower than the second voltage threshold, the current provided by the battery being reduced when going from the deteriorated mode to the critical mode.

BRIEF DESCRIPTION OF THE DRAWINGS

Other advantages and features will more clearly arise from the following description of particular embodiments of the invention given as non-limitative examples and represented in the appended drawings, in which.

DESCRIPTION OF A PREFERRED EMBODIMENT OF THE INVENTION

A stand-alone system can be described as a system which controls itself in an independent way. According to a particular embodiment example illustrated in FIG. 1, a stand-alone system can comprise an actuator 2, such as an engine, connected to a battery 1 for the supply thereof. The battery 1 can be connected to a renewable energy generator 3 in order to be recharged.

Figure 1:
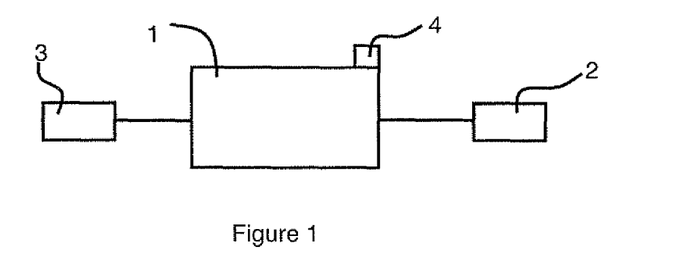
FIG. 1 illustrates a block diagram of a system used according to the method of the invention.

During a discharging phase for the battery 1, the stand-alone system can comprise at least one normal operating mode Mn and one deteriorated operating mode Md. Preferably, the current is imposed by the system. The current provided to the actuator by the battery in the normal mode Mn can correspond to the nominal current of the battery. The deteriorated mode Md allows a better autonomy of the stand-alone system at the expense of its performances, to do this the intensity of the current output by the battery 1 is higher in the normal mode Mn than in the deteriorated mode Md.

The method then comprises the following steps:

the measurement of a temperature $T_b$ representative of the temperature of the battery 1, the determination of a first voltage threshold $V_1$ depending upon the measured temperature Tb, the measurement of a voltage $V_b$ at the battery terminals, preferably, when the actuator 2 is not actuated in order that the voltage $V_b$ is stabilized, the determination of the operating mode, said stand-alone system being in the normal operating mode Mn when the measured voltage Vb is higher than the first voltage threshold $V_1$, and in the deteriorated operating mode Md when the measured voltage $V_b$ is lower than said first voltage threshold $V_1$, the current provided by the battery during an actuation being reduced when going from the normal mode Mn to the deteriorated mode Md.

Preferably, the current drop is significant so as to increase the autonomy of the system. As an example, the current provided by the battery during an actuation is reduced by at least 20% when going from the normal mode Mn to the deteriorated mode Md.

The measurement of the temperature $T_b$ representative of the battery can be carried out by a temperature sensor 4 placed in or near the battery.

The determination of the first voltage threshold $V_1$ can be carried out from a table comprising, for a plurality of temperature values or ranges of temperatures, values of the first associated voltage threshold $V_1$. The table can be drawn up from a standard battery for a given stand-alone system. Of course, the person skilled in the art can adapt any method allowing to obtain for a measured temperature $T_b$ of the battery the first voltage threshold $V_1$. This first voltage threshold $V_1$ can be established from standard batteries according to the number of desired actuations in each mode.

Figure 3:
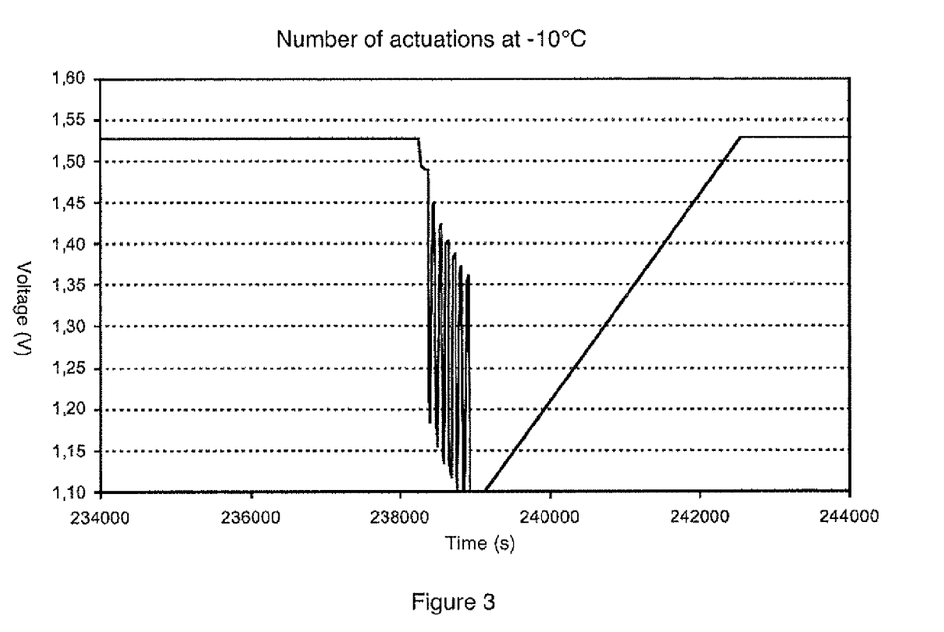
FIG. 3 illustrates a curve representative of the number of possible actuations of the system at a temperature of −10° C.

The measurement of the temperature $T_b$ of the battery enables to take into account the influence of the temperature on the early ageing thereof. At a low temperature, the internal impedance of the battery increases and the mobility of the carriers decreases, which decreases the discharge voltage at a constant current, and limits the total current that can be provided by the battery. Conversely at a high temperature, the deteriorating parasitic reactions are favored. In other words, the behavior of the batteries according to temperature is very different. This behavior is illustrated, for example, in FIGS. 3 to 6. FIG. 3 represents the time evolution of the voltage at the battery terminals when an engine is submitted to successive actuations at a battery temperature $T_b$ of $-10°$ C. Each peak of the curve has a high value corresponding to the value of the voltage at the battery terminals when there is no actuation and a low value corresponding to the voltage at the battery terminals during an actuation. An actuation for obtaining this figure corresponds to a constant current of 2 A during 30 seconds provided by a NiMh battery containing an accumulator having a capacity of 2.1 Ah and a nominal voltage of 1.2 V. During an actuation, if the voltage at the battery terminals reaches an operating voltage threshold $V_f$, of 1.1 V in FIGS. 3 to 6, the battery is regarded as completely discharged and must be then recharged. At the temperature of $-10°$ C., the battery enables to carry out six actuations (number of peaks) only before being regarded as discharged.

Figure 4:
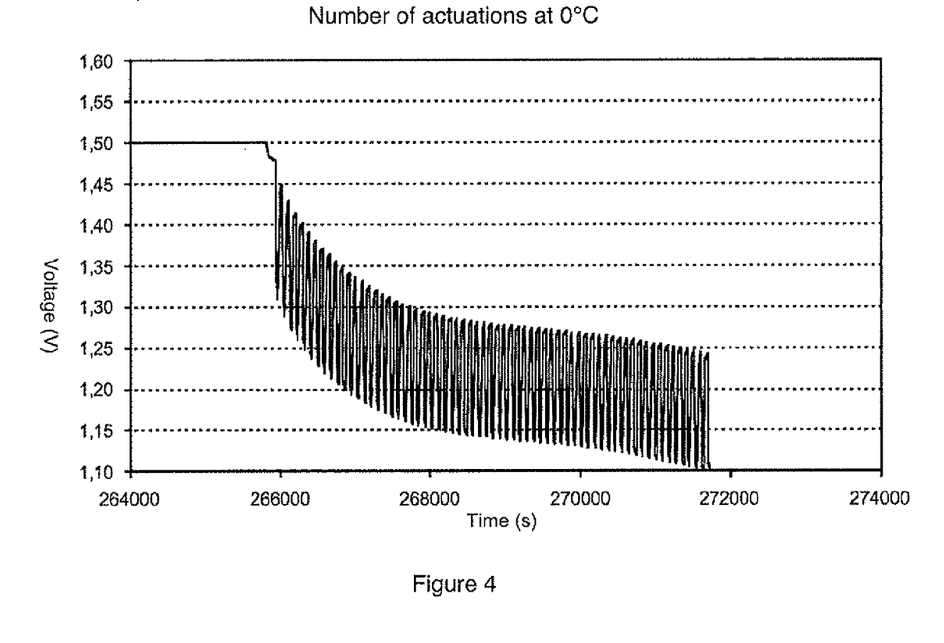
FIG. 4 illustrates a curve representative of the evolution of the voltage at the battery terminals at a temperature of 0° C. when the system is submitted to successive actuations.
Figure 5:
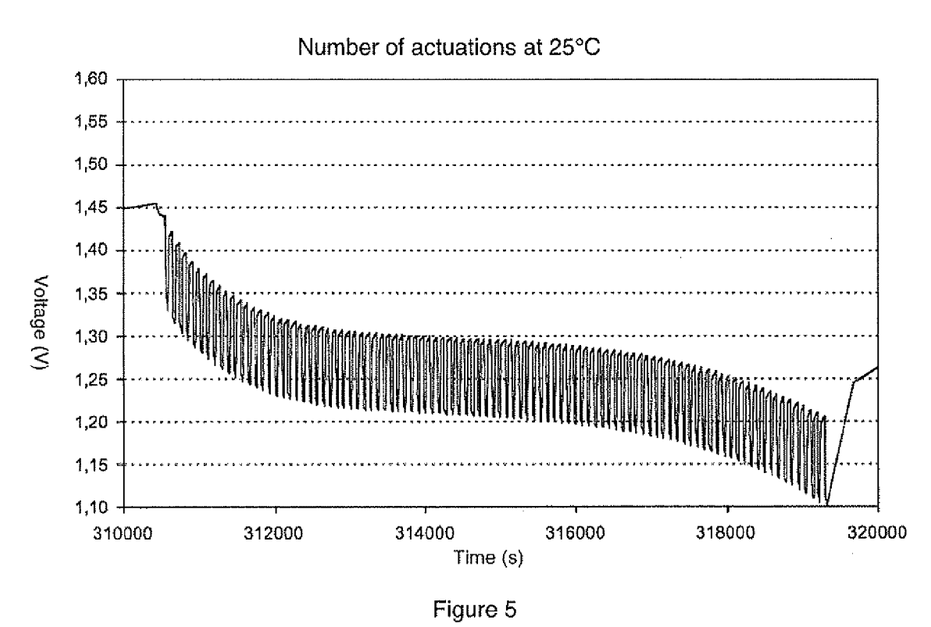
FIG. 5 illustrates a curve representative of the evolution of the voltage at the battery terminals at a temperature of 25° C. when the system is submitted to successive actuations.
Figure 6:
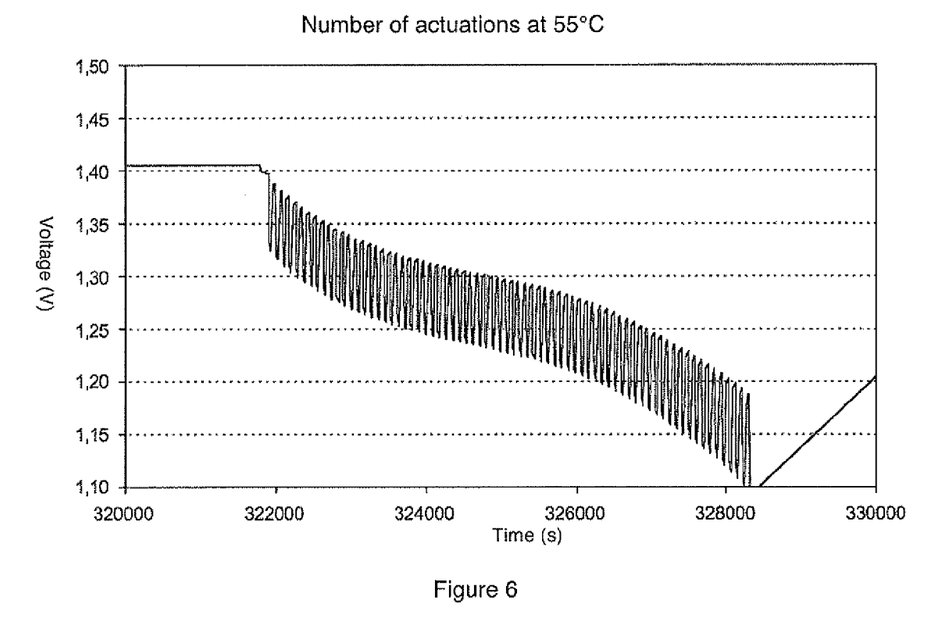
FIG. 6 illustrates a curve representative of the evolution of the voltage at the battery terminals at a temperature of 55° C. when the system is submitted to successive actuations.
Figure 7:
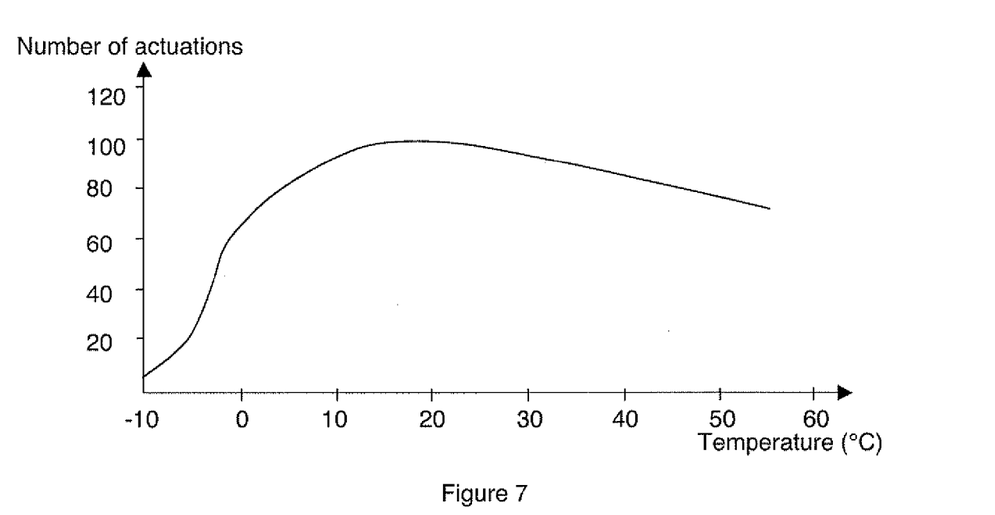
FIG. 7 illustrates a curve representative of the number of actuations according to the temperature with a constant current.

In FIGS. 4 to 6 it is represented the same curves as in FIG. 3 but for battery temperatures respectively equal to 0° C., 25° C. and 55° C. According to these Figures, it clearly appears that the more the temperature increases, the more the number of possible actuations before a total discharge of the battery increases. Indeed, it is possible to count 64 actuations at 0° C. (FIGS. 4) and 97 actuations at 25° C. (FIG. 5). It is also clearly obvious that the tendency is reversed when the temperature of the battery becomes too high as in FIG. 6, where one counts 71 actuations only before a complete discharge of the battery. This is confirmed by the test synthesis represented in FIG. 7 by the evolution of the number of possible actuations of the battery before it stops according to the temperature, the curve is increasing from $-10°$ C. up to approximately 20° C. then it becomes decreasing. The first voltage threshold $V_1$ used to determine the operating mode of the stand-alone system can be then given according to the measured temperature $T_b$.

Figure 8:
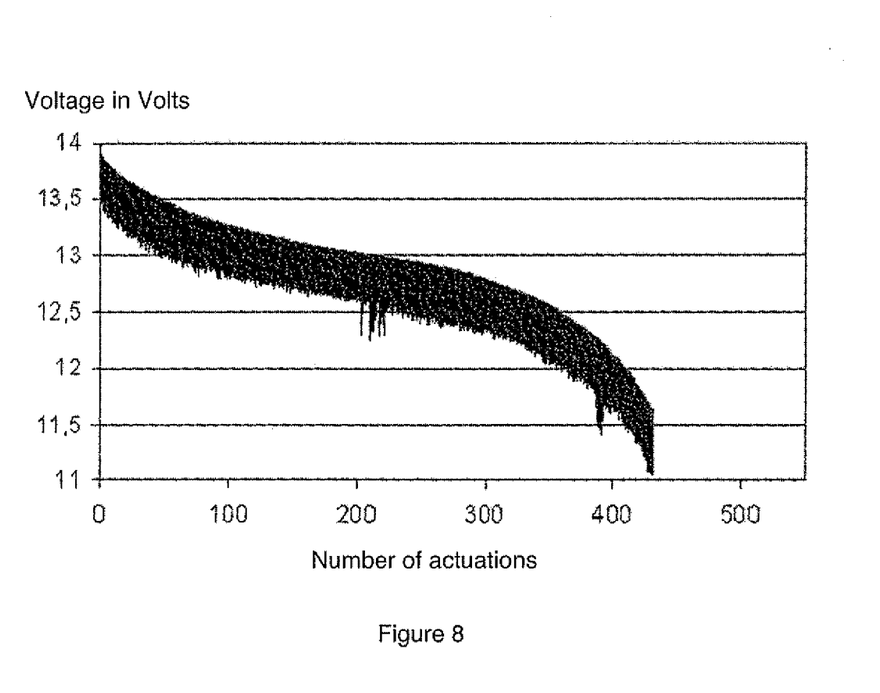
FIG. 8 illustrates the evolution of the voltage at the battery terminals according to the number of actuations without controlling the operating modes.
Figure 9:
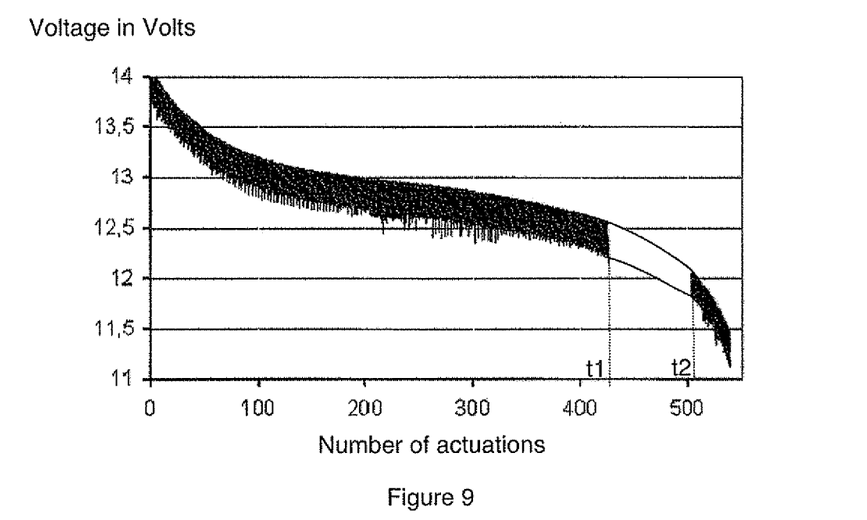
FIG. 9 illustrates the evolution of the voltage at the battery terminals according to the number of actuations when controlling the operating modes according to the invention.

The reduction in the intensity of the current to be provided by the battery 1 allows an optimization of the number of actuations of the engine and thus of the autonomy of the stand-alone system. As an example, it has been made a battery including 10 accumulators identical to that one used for defining the thresholds. Moreover, it is connected to an actuator whose consumption is different from that one used during the tests. Thus, in the normal mode Mn, the current output by the battery 1 can be limited to a current of 2 A then to a current of 1 A in the deteriorated mode. This optimization can be seen in FIGS. 8 and 9. FIG. 8 represents the time evolution of the voltage at the battery terminals at 25° C. for a succession of actuations until the total discharge. FIG. 9 represents the same thing with the difference that at the instant t1 there was a change in mode with a 50% drop of the current flowing through the battery (from 2 A to 1 A). When comparing the curves in FIG. 8 and in FIG. 9, it clearly appears that the autonomy of the stand-alone system is improved.

Consequently, the division of the operating process of the stand-alone system according to the temperature and the measured voltage allows to considerably increase the operating time. This increase is crucial for stand-alone systems because they do not have access to an unending power source. Indeed, battery recharging depends in general on renewable energies such as for example photovoltaic panels, wind-engines or water turbines. These sources of energies are variable and intermittent so that battery recharging is not always possible. Consequently, it becomes important to put off the instant when the stand-alone system is cut off in order to increase the recharging probabilities for the battery 1. Moreover, this change in mode enables to show the user that the battery discharging has begun and the use of the battery should be limited. Indeed, the current variation enables to observe that the behavior of the stand-alone system is changing.

In order to be able to recharge the battery 1, the operating voltage threshold $V_f$ can be higher than a minimum voltage value recommended by the manufacturer of the battery. Of course, the operating voltage threshold is lower than the first threshold $V_1$. Between the operating voltage threshold $V_f$ and the minimum value recommended by the manufacturer, the stand-alone system provides only the control of the battery recharging, the remaining capacity is thus reserved for a charger (not represented) making the interface between the source 3 of renewable energy and the battery 1.

Figure 10:
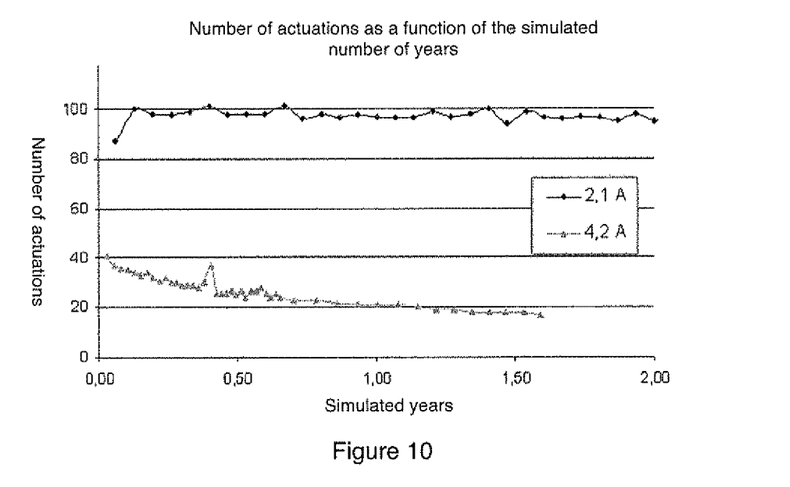
FIG. 10 illustrates the number of possible actuations of a battery according to the number of years simulated for two constant current values.

Moreover, the limitation of the current intensity for the battery 1 during its operating phases can have beneficial effects on its autonomy in the long run. FIG. 10 represents the evolution of the number of actuations of a battery, when completely recharged, according to the simulated years. The top curve represents a number of actuations carried out at 2.1 A and the bottom curve represents a number of actuations carried out at 4.2 A. While over the years the curve at 2.1 A remains relatively constant as for the number of actuations, the curve at 4.2 A undergoes a constant decrease. This decrease is due to deteriorating parasitic reactions generated in the battery when discharges are carried out too quickly. The parasitic reactions deteriorate the battery in particular at the end of the discharge, going from a normal mode Mn to a deteriorated mode Md limiting the current provided by the battery, it enables to decrease physical deteriorations of the battery, and thus to provide a better autonomy over the years of use. In other words, the reduction in current when going from the normal mode to the deteriorated mode will allow, in addition to the increase in remaining autonomy, to improve the lifespan of the battery.

Figure 2:
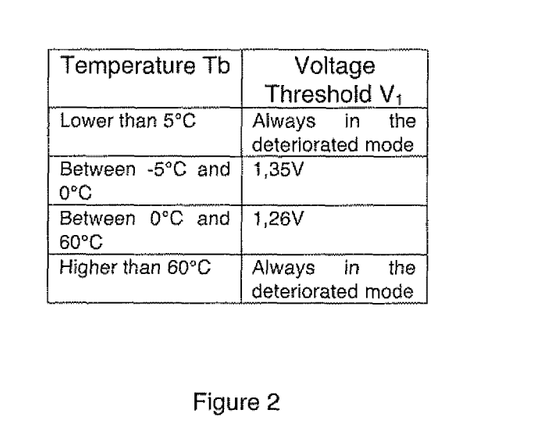
FIG. 2 illustrates a correspondence table between a temperature and a first voltage threshold.

According to an improvement, the method moreover comprises a critical operating mode Mc associated with a second voltage threshold $V_2$, function of the temperature Tb of the battery, and lower than the first voltage threshold $V_1$. The table in FIG. 2 can then have, for a given temperature or a given range of temperatures, an additional input representative of the second voltage threshold $V_2$. Thus, the stand-alone system is in the deteriorated operating mode Md when the measured voltage is comprised between the first voltage threshold $V_1$ and the second voltage threshold $V_2$, and in the critical mode when the measured voltage is lower than the second threshold. In the same way as when going from the normal mode Mn to the deteriorated mode Md, the current provided by the battery is reduced when going from the deteriorated mode Md to the critical mode Mc so as to increase the autonomy of the stand-alone system. Preferably, this reduction in current is of at least 20%. Going to the critical mode is illustrated at the instant t2 in FIG. 9.

Figure 11:
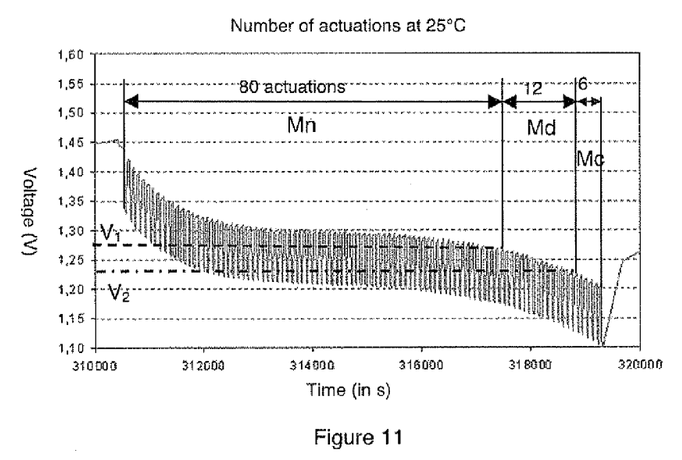
FIG. 11 illustrates the time variation of the voltage at the battery terminals at a temperature of 25° C. in the normal mode.

FIG. 11 illustrates the operation of a battery at a temperature of 25° C. in the normal mode. This curve enables to determine the first and second thresholds $V_1$, $V_2$. In the normal mode, the battery allows 98 actuations. In order to determine the thresholds, it is considered that the normal mode Mn requires 80 actuations, the deteriorated mode Md requires 12 actuations and the critical mode requires 6 actuations. In FIG. 11, the apex of a voltage peak is representative of the voltage of the battery at rest between two actuations, i.e. when there is no actuation. The first threshold $V_1$ is then measured after the eightieth actuation when no actuation is performed and the second threshold $V_2$ is measured after the ninety second actuation when no actuation is performed. Thus, the first voltage threshold $V_1$ is of 1.27 V and the second voltage threshold $V_2$ is of 1.22 V. Thereafter, going from one mode to another will be determined by the measurement, preferably between two actuations, of the voltage $V_b$ at the terminals of the battery 1. Of course, according to applications, it is possible to determine the thresholds according to the number of desired actuations in each operating mode.

If a second voltage threshold $V_2$ is used in combination with the operating voltage threshold $V_f$, this threshold is lower than the second voltage threshold $V_2$ and higher than the value provided by the manufacturer. Thus, below said operating voltage threshold $V_f$, the stand-alone system provides only the control of the battery recharging.

According to an alternative embodiment, the method comprises a minimum value of temperature Tmin below which the use of the stand-alone system is prohibited.

According to another alternative embodiment, possibly in combination with the preceding embodiment, the method can comprise a maximum value of temperature Tmax above which the use of the stand-alone system is prohibited.

Figure 12:
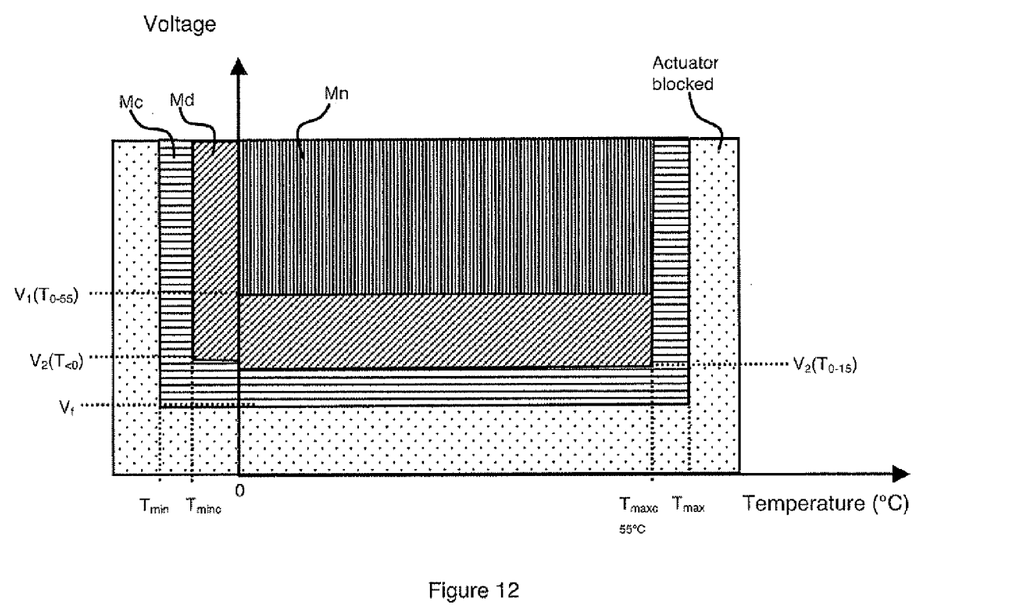
FIG. 12 illustrates an operation diagram for the control of the discharging process for the battery.

A particular example of the control of the system, including the improvement and both variants integrating a maximum operating temperature value Tmax and a minimum operating temperature value Tmin can be summarized by FIG. 12. In FIG. 12, the voltage is represented according to the temperature, and the normal, deteriorated and critical operating modes, Mn, Md and Mc respectively, are represented by hatched parts. When taking into account the various variants and embodiments, the stand-alone system is not active as soon as the temperature is lower than the minimum temperature threshold Tmin, higher than the temperature threshold Tmax, or if the measured voltage $V_b$ is lower than the operating voltage threshold $V_f$. Below 0° C., the stand-alone system is able to function only in the deteriorated mode Md or critical mode Mc. Indeed, in the normal mode Mn, the battery would be discharged too quickly (see FIG. 3). Below 0° C., if the battery voltage is higher than the second voltage threshold $V_2$ (T<0), the operating mode is then the deteriorated mode Md, otherwise the stand-alone system functions in the critical mode Mc. For a positive temperature, the first voltage threshold corresponds to $V_1$ ($T_{0-55}$) and the second voltage threshold corresponds to $V_2$ ($T_{0-55}$).

When the conditions of temperature are extreme, for positive temperatures as well as for negative temperatures, it can be possible to force the operating mode into the critical mode Mc below a minimum critical temperature Tminc higher than the temperature Tmin and above a maximum critical temperature Tmaxc lower than the temperature Tmax. In FIG. 12, Tmaxc is equal to 55° C.

Of course, the man skilled in the art will be able to adapt the various thresholds according to the use and the type of the stand-alone system.

Figure 13:
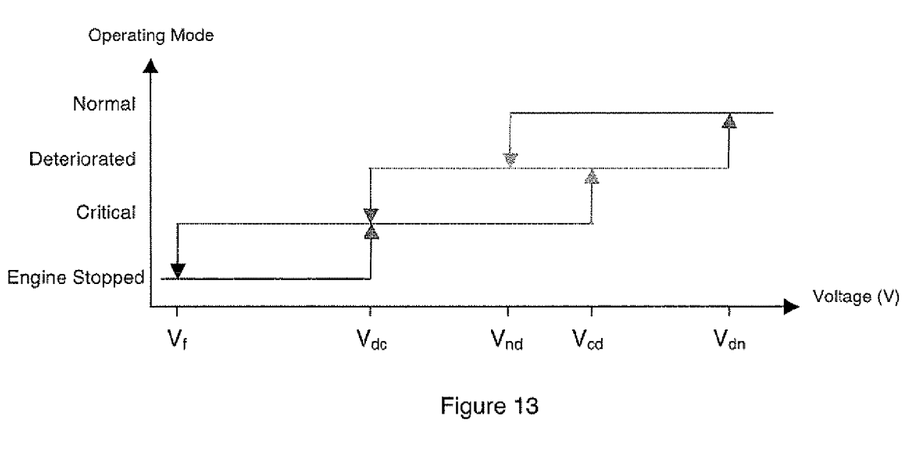
FIG. 13 illustrates a hysteresis of the change in operating mode.

As previously explained, temperature can cause a variation in voltage. Thus, when the battery is in a state close to a change in mode, a variation in temperature can make the voltage oscillate above and below the threshold associated with the change in mode. This can also occur during a fluctuation of current or a relaxation phase of the battery between two actuations. To prevent this phenomenon from inducing an instability in the control of the system and too frequent changes in operating mode, it is possible to define a voltage hysteresis for going from one mode to the other. Such a hysteresis is illustrated in FIG. 13. Thus, in FIG. 13, going from the normal mode Mn to the deteriorated mode Md is carried out at a measured voltage $V_{nd}$, going from the deteriorated mode Md to the normal mode Mn is carried out at a voltage $V_{dn}$ higher than the voltage $V_{nd}$. Going from the deteriorated mode Md to the critical mode Mc is carried out at a voltage $V_{dc}$ lower than the voltage $V_{nd}$ and going from the critical mode Mc to the deteriorated mode Md is carried out at a voltage $V_{cd}$ comprised between the voltages $V_{nd}$ and $V_{dn}$, or between the voltages $V_{dc}$ and $V_{nd}$. The actuator of the stand-alone system is blocked when the voltage has reached the minimum operating voltage $V_f$ and is unblocked when the voltage becomes again higher than or equal to the voltage $V_{dc}$. The voltage values of the hysteresis are given in order to guarantee a sufficient stability in the various modes and thus a reassuring operation for the user.

A similar hysteresis can be carried out for changes with only one threshold when the temperature of the battery is negative (only two operating modes being authorized).

The method can be controlled by a controller provided with a memory and a processor enabling to process the various data and to implement the variants and embodiments of the method.

The above-described control laws for the method can be applied to various systems with different objectives.

For example, in the case of a lighting system such as a panel of LEDs, the luminous flow generated by the LEDs is proportional to the current flowing through them. If we desire to show the user that the battery is almost discharged, by decreasing the light intensity by 20%, it is necessary to decrease the current by 20%. In this case, going from the normal mode to the deteriorated mode will result in a reduction in the discharge current of the battery by 20%. If this lighting system is integrated into a laptop, and if we desire to show the user that the charge of the battery is low, the best way to do that is to decrease the intensity of the screen lighting system. For a top-of-the-range PC, the power consumption for the system is about 250 W, and the power consumption for the screen is about 25 W. A reduction by 20% of the power supply for the LEDs will thus result at the most in a drop of the power consumption for the screen by 5 W. These 5 W represent only 2% of the power consumption for all the system. In this case, going from the normal mode to the deteriorated mode will thus result in a reduction in the discharge current of the battery by 2%. It should be noted that in this example it is probably impossible to decrease the power consumption for the system by 20% without preventing the system from running.

In the case of a stand-alone house shutter, what is mainly expected concerning the various modes is to inform the user. Indeed, because of its design and the nature of its losses (dry frictions), the reduction in the power supply for the shutter engine does not result in an important decrease in the energy necessary to move it. The definition of the current in the deteriorated mode is related thus to a certain number of constraints of use: it is necessary that the shutter moves sufficiently slowly so that the user is aware of the fact that the battery works under bad conditions, while functioning satisfactorily. In practice time can be doubled or tripled. To get this result, the value of the control current can be decreased from 20 to 40%.

According to a last example relating to batteries for supplying an electric vehicle, we can desire to lower the power consumption of the system in order to increase autonomy and to allow the user to reach a recharging station. It will however be impossible to decrease the power provided to the engine as we like without compromising the security of the user (capacity of acceleration and maximum speed of the vehicle, for example on a highway). The minimum power that can be provided to the system will thus depend only on the physical need (power necessary to reach a minimum speed) independently of its nominal power. Thus for rolling at 90 km/h (by considering that it represents the minimum speed for rolling safely on a highway) a power of about 15 kW is necessary. If the nominal power of the vehicle is of 45 kW, the current can thus be decreased by approximately 67%, but if it is of 30 kW, it can be dropped only by 50%.

The invention claimed is:

1. Method for using a stand-alone system comprising an actuator connected to a battery, the method comprising, during a discharging phase of the battery, the following steps:
    Measuring a temperature representative of a temperature of the battery,
    Determining a first voltage threshold depending upon the measured temperature,
    Measuring a voltage at battery terminals,
    Determining an operating mode of the stand-alone system between at least a normal operating mode and a deteriorated operating mode, wherein the stand-alone system is in the normal operating mode when the measured voltage is higher than the first voltage threshold and in the deteriorated operating mode when the measured voltage is lower than the first voltage threshold, a current provided by the battery during an actuation being reduced in the deteriorated operating mode compared to the normal operating mode.

2. Method according to claim 1, wherein measuring the voltage at battery terminals is carried out when the actuator is not actuated.

3. Method according to claim 1 wherein determining the operating mode of the stand-alone system is performed between the normal operating mode, the deteriorated operating mode and a critical operating mode wherein the stand-alone system is in the deteriorated operating mode when the measured voltage is comprised between the first voltage threshold and a second voltage threshold, and in the critical operating mode when the measured voltage is lower than the second voltage threshold, the current provided by the battery being reduced in the critical operating mode compared to the deteriorated operating mode, the second voltage threshold being function of the temperature and lower than the first voltage threshold.

4. Method according to claim 2, comprising comparing the measured voltage to an operating voltage threshold higher than a value provided by a manufacturer of the battery and lower than the first voltage threshold, wherein the stand-alone system provides only the control of the recharging of the battery when the measured voltage is lower than said operating voltage threshold.

5. Method according to claim 3, comprising comparing the measured voltage to an operating voltage threshold higher than a value provided by a manufacturer of the battery and lower than the second voltage threshold, wherein the stand-alone system provides only the control of the recharging of the battery when the measured voltage is lower than said operating voltage threshold.

6. Method according to claim 1 comprising comparing the measured temperature to a minimum value of temperature below which the use of the stand-alone system is prohibited.

7. Method according to claim 1 comprising comparing the measured temperature to a maximum value of temperature above which the use of the stand-alone system is prohibited.

* * * * *